United States Patent [19]

Straub

[11] 4,108,479

[45] Aug. 22, 1978

[54] PIPE COUPLING

[76] Inventor: Immanuel Straub, 7323 Wangs, Switzerland

[21] Appl. No.: 816,269

[22] Filed: Jul. 15, 1977

[30] Foreign Application Priority Data

Jul. 21, 1976 [AT] Austria ................................ 5376/76

[51] Int. Cl.² ........................................... F16L 17/00
[52] U.S. Cl. ..................................... 285/112; 285/373
[58] Field of Search ............... 285/105, 104, 112, 373, 285/340

[56] References Cited

U.S. PATENT DOCUMENTS

| | | | |
|---|---|---|---|
| 1,928,821 | 10/1933 | Santiago | 285/105 |
| 2,459,251 | 1/1949 | Stillwagon | 285/373 X |
| 2,491,004 | 12/1949 | Graham | 285/105 |
| 2,635,901 | 4/1953 | Osborn | 285/112 X |
| 3,582,112 | 6/1971 | Pico | 285/105 X |
| 3,877,733 | 4/1975 | Straub | 285/105 |

*Primary Examiner*—Thomas F. Callaghan
*Attorney, Agent, or Firm*—Werner W. Kleeman

[57] ABSTRACT

A pipe coupling comprising a housing which can be clamped about pipe ends which are to be interconnected, and within which housing there is enclosed an inwardly open sealing gasket possessing a substantially C-shaped axial cross-sectional configuration, and both ends of which are supported upon the outer jacket surface of a respective substantially truncated cone-shaped clamping ring, each of which is retained at its outer periphery in the axial direction within the housing and is provided with claws which engage with the periphery of the pipe ends. The clamping rings are clamped in the housing at the region of their larger diameter by means of a fixture or socket engaging both at their outer as well as their inner jacket surface.

10 Claims, 5 Drawing Figures

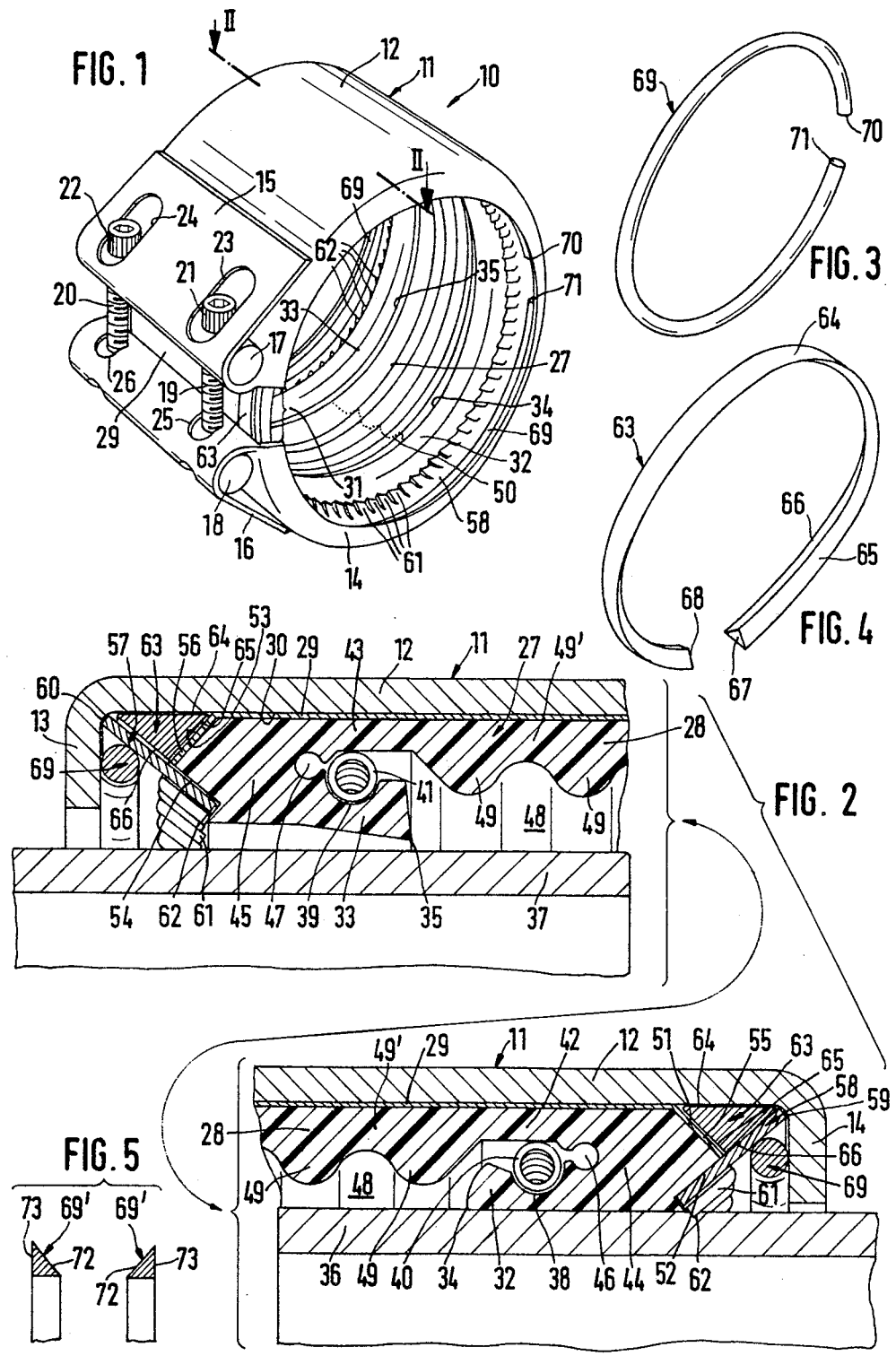

PIPE COUPLING

BACKGROUND OF THE INVENTION

The present invention relates to a new and improved construction of pipe coupling of the type comprising a housing which can be clamped about pipe ends of pipes which are to be interconnected, there being enclosed within such housing an inwardly open sealing gasket of substantially C-shaped axial cross-sectional configuration, both of the end faces or sides of which are supported at the outer jacket surface of a respective substantially truncated cone-shaped clamping ring retained at its outer periphery in axial direction in the housing and engaging by means of claws with the periphery of the pipe ends.

In German patent publication No. 24 28 101 there is taught such type pipe coupling. It is suitable for readily interconnecting unprocessed, that is to say, simply cut-to-length pipes, regardless of the material from which they are formed, without any further preparatory or post-work. While with the prior art pipe coupling there is provided directly after clamping of the housing about the pipe ends to be interconnected a faultless sealed connection between such pipe ends, even before the pipes are subjected to internal pressure, nonetheless it has been found that this state-of-the-art pipe coupling in certain cases, with the housing only fixedly clamped but not yet back-loading of the pipes, only provides in axial direction a force-locking connection. This is so because the claws of the clamping rings, during tightening of the housing (depending upon the material from which the pipes are formed), do not yet sufficiently dig into the jacket or outer surface of the pipes.

In other words with the heretofore known pipe coupling the aperture angle of the truncated cone-shaped clamping rings is initially reduced. First then when the pipes are exposed to an internal pressure, which also acts through the pipe joint upon the inside of the gasket, is there an increase of the contact pressure of its end faces at the outer jacket surface of the clamping rings (which are axially retained in the housing), so that such first then, while increasing its aperture angle, sufficiently digs or penetrates by means of its claws into the jacket surface of the interconnected pipes. Only upon the presence of an internal pressure in the pipes does the prior art pipe coupling also provide a connection comparable to a form-locking connection also in the axial direction. This holds true in all cases where an appreciable axial load of the pipe connection first arises in the presence of internal pressure, in another words, for instance, in the case of shorter pipe conduits and those whose individual pipe sections are held by additional means, such as pipe clamps and the like.

On the other hand, in the case of longer pipe conduits it is hardly possible to prevent for instance axial loads at connection locations which have already been equipped with a clamped or tightened coupling when there does not prevail any internal pressure or at times when internal pressure is absent. This is the case for instance during the assembly of longer pipe conduits, but also when the pipe conduits are without pressure for a period of time due to thermal expansion of the pipes.

An axial load in the case of a pipe coupling which engages only in a force-locking or frictional manner however leads to an axial displacement of the one and-/or the other pipe end with respect to the pipe coupling. This axial displacement or shifting is not only undesirable, but brings with it, especially with very rough outer surfaces of the pipes, the risks that with the prior art pipe coupling the sealing lips formed at the ends of the C-shaped sealing gasket will be damaged, for instance abraded, so that the sealing capability thereof is impaired.

SUMMARY OF THE INVENTION

Hence, it is a primary object of the present invention to provide a new and improved construction of a pipe coupling of the previously mentioned type, by means of which, upon tightening or clamping the housing, there is not only established a sealingly tight interconnection of the pipe ends but also an interconnection which is comparable to a form-locking connection.

Another important object of the present invention aims at the provision of a new and improved construction of pipe coupling which is relatively simple in design, economical to fabricate, extremely reliable in operation, easy to use, and not associated with the drawbacks of the prior art constructions discussed above.

Now in order to implement these and still further objects of the invention, which will become more readily apparent as the description proceeds, the proposed pipe coupling of this development is manifested by the features that the clamping rings are clamped at the region of their larger diameter by means of a socket or mounting in the housing, which socket or mounting engages both at their outer as well as at their inner jacket surface or shell.

The mounting or socket can possess at least two ring segments which as concerns their diameter are capable of resiliently contracting to a certain extent, of which the one engages at the inner surface of the associated clamping ring and the other at the outer surface thereof. These ring segments are advantageously constructed in the form of snap rings, the gaps of which are arranged rotatively or turned with regard to one another. At least one of these ring segments can possess a conical surface which bears flatly at the associated jacket surface of the clamping ring. It is advantageous if this ring segment with the conical surface is the one which engages with the outer jacket surface of the clamping ring. The ring sement engaging at the inner jacket surface of the clamping ring can bear along a circular line or arc, i.e. does not bear flat at such jacket surface.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective view of a pipe coupling ready to be mounted upon the pipe ends which are to be interconnected;

FIG. 2 is a cross-sectional view taken substantially along the line II—II of FIG. 1 with the pipe ends introduced into the pipe coupling, and such section is shown in two superimposed halves, wherein the upper half essentially corresponds to the half of the pipe coupling appearing at the left of FIG. 1 at the time that such coupling is still loosely drawn about the corresponding pipe ends, and on the other hand, the lower half portrays the half of such pipe coupling appearing at the right of FIG. 1 when the housing is clamped or tightened;

FIGS. 3 and 4 are respective perspective views of two of the elements of the pipe coupling illustrated in FIG. 1, showing the same as if such elements of FIG. 1 were removed therefrom without any rotation thereof; and FIG. 5 is a partial sectional view of a variant exemplary embodiment of the element shown in FIG. 2.

DETAILED DESCRIPTION OF THE PREFERRED EMBODIMENTS

Describing now the drawings, the pipe coupling 10 illustrated by way of example in FIGS. 1 and 2 will be seen to comprise a housing 11 approximately in the shape of a tightening clamp or collar, the housing body 12 of which is essentially cylindrical and possesses at its ends inwardly directed flanges 13 and 14. The housing 11 is formed of one-piece of a high strength sheet metal, for instance rust proof steel. Flaps 15 and 16 formed integrally or of one-piece with the housing 11 and flexed outwardly and away from one another enclose a respective, for instance, cylindrical clamping rod 17, 18 or equivalent structure. These clamping rods 17 and 18 are interconnected with one another by means of a number of bolts, here shown as two internal hexagonal bolts 19 and 20. The free end edges of the flaps 15 and 16 are advantageously welded with the outer jacket or shell surface of the housing body 12.

In the exemplary embodiment under discussion the heads 21 and 22 of the internal hexagonal bolts 19 and 20, respectively, are accessible by means of elongate holes 23 and 24, respectively, formed in the flap or tab 15. The part of the bolts 19 and 20 merging with the heads 21 and 22, respectively, engages with somewhat play through not particularly illustrated transverse bores in the clamping rod 17, through non-visible openings at the flexed region of the flap 15, then with play through openings 25, 26 at the bent or flexed region of the flap 16 and finally in transverse bores provided with internal threading and disposed at the clamping rod 18. From what has been discussed above it will be apparent that the housing 11 can be contracted or drawn together by tightening the bolts 19, 20 in the manner of a tightening clamp or collar.

As to the components which are present in the housing 11 between the flanges 13 and 14 attention is especially directed to the showing of FIG. 2. The housing 11 encloses or surrounds a sealing gasket 27, preferably formed of a synthetic rubber. This sealing gasket 27 is inwardly open and possesses a substantially C-shaped configuration in its axial cross-section. It has a web 28 which tightly bears at its outer surface or side, while interposing a steel band insert 29, at the cylindrical inner surface 30 of the housing body 12. The steel band insert 29, among other things, serves to bridge the gap, generally indicated in FIG. 1 by reference character 31, present between the flexed or bent regions of the flaps or tabs 15 and 16. Further details of the steel band insert 29 will be considered hereinafter.

Merging with both ends of the web 28 of the sealing gasket 27 are the ends thereof which are formed as sealing lips 32 and 33. These sealing lips 32 and 33 possess at their free end edge a sharp sealing edge 34 and 35 respectively, which upon clamping or tightening of the housing 11 sealingly come to bear upon the jacket or shell surface of the pipe ends 36, 37 which are to be interconnected by the pipe coupling 10, wherein it will be observed that at the upper portion of the showing of FIG. 2 the housing is not yet fixedly clamped. At each side of the sealing lips 32, 33 confronting the web 28 there is formed an annular or ring-shaped groove 38, 39 which is open towards the outside and possesses an approximately semicircular-shaped cross-sectional configuration. In each such ring-shaped groove 38, 39 there is imbedded a practically closed, slightly expansible metallic helical spring ring 40 and 41 respectively. Such bear at their outer periphery a comparatively thin-wall region 42 and 43 of the web at its inside and is conversely also supported thereon. Between the ring-shaped grooves 38 and 39 and the actual root 44 and 45 of the sealing lips 32 and 33 there is present a respective ring-shaped hollow space or chamber 46 and 47 which communicates by means of the windings of the helical spring ring 40 and 41 with the space or chamber 48 between the inside of the web 28 and the outside of the pipe ends 36 and 37.

The purpose of this arrangement is the following. The helical spring rings 40 and 41 essentially carry out four functions. By virtue of the fact that they are supported at their outer periphery at the inside of the regions 42 and 43 of the web 28, they first of all ensure that during clamping of the housing the sealing lips 32 and 33 will be pressed immediately with a larger radial contact force than only by the inherent elasticity against the outside of the pipe ends 36 and 37 respectively. Secondly, since they are slightly expanded, they ensure that the internal pressure of the pipes, which impinges through the pipe joint the space or chamber 48, is effective over the entire length of the side of the sealing lips 32 and 33 confronting the web 28 inclusive of the hollow spaces or chambers 46 and 47 and thus hydrostatically inwardly presses the sealing lips at their entire outer periphery. Thirdly, the helical spring rings ensure, especially upon loss of the inherent elasticity of the material of the sealing gasket 27 due to ageing and/or multiple thermal alternating loads which occur over a longer period of time, displacement of the sealing lips 32 and 33 always at the outer periphery of the pipe ends 36 and 37, also then if at any time there is not present any internal pressure and even if the possibly no longer sufficient elastic material of the gasket would enable lifting-off of the sealing lips 32 and 33. Fourthly, the helical spring rings 40 and 41 also prevent a lifting-off of the thin-wall regions 42 and 43 of the gasket web 28 from the steel band insert 29, which lifting-off action can arise by virtue of the practically unavoidable ageing of rubber material in the presence of thermal loads, and as soon as the internal pressure of the pipe no longer prevails.

This last-mentioned phenomenon also is counteracted by the particular profiling of the inside of the region of the web 28 which is disposed between the sealing lips 32 and 33. It will be recognized that this region does not exhibit a constant wall thickness, rather has mutually axially spaced, substantially ring-shaped beads 49 which alternate with more thin-walled sections 49'. These beads 49 and thin-wall sections or portions 49' protrude towards the inside and impart to the inner surface of the web an undulated or wavelike profile or configuration. This profile has been indicated in FIG. 1 by the broken lines 50. These beads 49 serve as radially outwardly effective reinforcement ribs, the effectiveness of which increases with increasing temperature and along therewith with increasing expansion of the material of the sealing gasket. These beads 49 prevent a lift-off of the web 28 from the steel band insert 29 even if the gasket-material has aged to such an extent that its elastic properties have become more like plastic properties.

The end faces of the sealing gasket 27 are subdivided into two essentially conical surfaces 51, 52 and 53, 54 respectively. The radially outer conical surfaces 51, 53 bear at the inwardly flexed or bent side edges 55, 56 of the steel band insert 29. Although not particularly illustrated, such itself advantageously possesses, in the non-tightened condition of the housing 11, the shape of a not completely closed winding, and the ends thereof are approximately spaced from one another through a distance corresponding to the spacing of the flexed sections of the flaps 15 and 16, whereby however it is to be understood that such ends of the steel band insert 29 are preferably arranged at a location situated diametrically opposite the gap 31.

The inner conical surfaces 52 and 54 of the ends of the gasket 27 each tightly abut against a substantially truncated-shaped clamping ring 58 and 57, respectively. Each such clamping ring, likewise fabricated of a high strength steel, comprises a band which is conically bent into somewhat more than one winding with mutually loose overlapping winding ends. At their greater diameter the clamping rings 57 and 58 are axially retained in the housing in the respective throat or fillet 59 and 60 between the housing body 12 and respective flange 14 and 13. At the region of their smaller diameter the clamping rings possess a large number of lamellae or tabs 61 which are formed by substantially J-shaped cut-outs, these lamallae being turned-out of the conical surface of the related clamping ring, so that they overlap one another in an imbricated fashion.

The free end edges of each of these lamellae or tabs 61 thus forms a claw 62 which is intended to dig into the jacket or shell surface of the pipe ends to be interconnected and to be fixedly anchored thereat.

Now if starting with the position portrayed at the top of the showing of FIG. 2 the housing 11 is clamped over the pipe ends 36, 37 which are formed of a particularly tough or hard material, then, just as was the case for the prior art pipe coupling, the claws 62 are not capable of sufficiently anchoring themselves at the outer surface of the pipe ends in order that there would be provided a connection comparable to a form-locking or positive connection, because initially they only bear at the outer surface of the pipe ends, and therefore, during further tightening or clamping of the housing, the clamping rings elastically deform into a more acute cone.

However, with the illustrated coupling this is not the case, and specifically because both of the clamping rings 57 and 58 are clamped at the region of their larger diameter, in other words at the region of the respective throat or fillet 60 and 59, by a socket or fixture which engages both at the outer jacket surface or shell as well as also the inner jacket surface or shell. This socket, on the one hand, comprises an outer, massive circlip or snap ring 63 (cf. FIG. 4) possessing a cross-section in the form of a triangle with inwardly pointing tip or apex. The snap ring 63 thus possesses a cylindrical outer surface 64 which snugly bears at the inside or inner surface 30 of the housing 12 at the region of the throats or fillets 59, 60, a first substantially conical surface 65 which snugly bears at the side edges 55 and 56, respectively, and thus upon the conical surfaces 51 and 53, respectively, of the ends of the gasket 27, and finally a second substantially conical surface 66 which snugly bears at the outer jacket surface or shell of the clamping rings 57 and 58 respectively. As best seen by referring to FIG. 4, the ends 67, 68 of the snap ring 63 (with non-clamped housing 11) are located at most from one another to such an extent as the flexed parts of the flaps 15 and 16, so that upon tightening the housing 11 they come to snugly bear upon one another and the snap ring 63 becomes a stiff, closed ring. The gap between the ends 67 and 68 is of course arranged to be turned with regard to the gap 31, as will be apparent from the showing of FIG. 4 in conjunction with that of FIG. 1.

On the other hand, the socket or mounting of the clamping rings 57 and 58 provided with the lamallae or tabs possesses a further snap ring 69 (FIG. 3) engaging at its inner jacket surface, which snap ring, in the embodiment of FIGS. 1 and 3, possesses a circular-shaped cross-section. Each such snap ring 69 is supported at the inside of the related flange 13 and 14 respectively, as shown. The ends 70 and 71 of the snap ring 69 (with non-tightened housing 11) are located approximately at the same spacing from one another as the ends 67, 68 of the snap rings 63 and can come to tightly or snugly bear against one another when the housing is tightened. The gap between the ends 70 and 71 is arranged so as to be turned in the coupling 10 both with regard to the gap 31 as well as also with respect to the gap between the ends 67 and 68.

The mounting or socket which is defined by the snap rings 63 and 69 of the clamping rings 58 and 57 affords, notwithstanding the flexibility of the material of the gasket 27, the assurance that upon tightening the housing 11 the claws 62 will be directly forced to anchor into the outer surface of the pipe ends 36 and 37 to be interconnected, even if there is not yet present any hydrostatic pressure in the space or chamber 48 which would be effective by means of the incompressible gasket 27 thereof. Right from the start the illustrated pipe coupling provides not only a tight sealing connection of the pipe ends but also a form-locking connection which is the same in axial direction as well as in the rotational direction, as soon as the housing is fixedly clamped. With the prior art pipe coupling such first only could be achieved at such time as the internal pressure of the pipes is effective upon the gasket.

A variant embodiment of the snap rings 69 has been shown in FIG. 5. In the showing of FIG. 5 the snap ring has been designated by reference character 69' and will be seen to comprise a triangular cross-section and thus a conical surface 72 which is destined to bear at the inner jacket surface of the clamping ring 57 and 58, respectively, as well as a flat ring-shaped surface 73 which is intended to bear at the inside of the flange 13 and 14 respectively. What is of importance — and this is also true of the snap ring 69 — is that the radial innermost point of attack of the clamping ring which engages at the inner jacket surface of the clamping rings 57 and 58 is located at a larger diameter than the innermost point of attack of the clamping ring 63 which engages at the outer jacket surface or shell of the clamping rings 57 and 58 respectively. Consequently, the clamping rings 57 and 58 have the possibility of enlarging their aperture angle under the action of the pressure prevailing in the space or chamber 48, with the result that the claws 62 tend to dig even more deeply into the outer surface of the pipe ends 36 and 37 which are to be interconnected.

While there are shown and described present preferred embodiments of the invention, it is to be distinctly understood that the invention is not limited thereto, but may be otherwise variously embodied and practiced within the scope of the following claims.

What is claimed is:

1. A pipe coupling for coupling together the pipe ends of pipes which are to be interconnected, comprising:
   a housing;
   means for clamping the housing about the pipe ends intended to be interconnected;
   a sealing gasket enclosed in said housing and possessing a substantially C-shaped axial cross-sectional configuration;
   said sealing gasket being open towards the inside and having end faces;
   a respective substantially truncated cone-shaped clamping ring having an inner jacket surface and an outer jacket surface, each said outer jacket surface supporting thereat an associated one of said end faces of said sealing gasket;
   each of said clamping rings being retained at its outer periphery and in the axial direction within said housing and being provided at its inner periphery with claws engaging with the pipe ends when said housing is being clamped; and
   mounting means for clamping said clamping rings within the housing at the region of their outer periphery, said mounting means engaging the outer and inner jacket surfaces of said clamping rings for preventing said clamping rings from being bent when said housing is being clamped.

2. The pipe coupling as defined in claim 1, wherein:
   said mounting means comprises at least two ring segments which are resilient and limitedly contractable in their diameter;
   one of said ring segments engaging at the inner jacket surface of the related clamping ring and the other ring segment engaging at the outer jacket surface of the related clamping ring.

3. The pipe coupling as defined in claim 2, wherein: each of said ring segments comprises a snap ring having a gap; and wherein,
   the gap of one snap ring is turned with respect to the gap of the other snap ring.

4. The pipe coupling as defined in claim 2, wherein:
   at least one of the ring segments possesses a substantially conical surface which bears essentially flatly upon the associated jacket surface of the related clamping ring.

5. The pipe coupling as defined in claim 2, wherein:
   the ring segment engaging at the outer jacket surface possesses a substantially conical surface which flatly bears against such jacket surface and a substantially cylindrical surface which flatly bears at the inner surface of the housing.

6. The pipe coupling as defined in claim 2, wherein:
   the ring segment engaging at the inner jacket surface of the related clamping ring bears along a circular line at its jacket surface.

7. The pipe coupling as defined in claim 5, wherein:
   the ring segment engaging at the outer jacket surface possesses a cross-sectional configuration in the form of a triangle with inwardly directed apex.

8. The pipe coupling as defined in claim 6, wherein:
   said ring segment which engages at the inner jacket surface possesses a substantially circular cross-sectional configuration.

9. The pipe coupling as defined in claim 4, wherein:
   said ring segment engaging at the inner jacket surface of the clamping ring possesses a substantially conical surface which flatly bears at such jacket surface.

10. The pipe coupling as defined in claim 9, wherein:
    the generatrix of the substantially conical surface bearing at the inner jacket surface of the clamping ring is shorter than the generatrix of the substantially conical surface bearing at the outer jacket surface of the clamping ring.

* * * * *